(12) United States Patent
Scharfenberger et al.

(10) Patent No.: US 10,044,050 B2
(45) Date of Patent: Aug. 7, 2018

(54) ELECTRICALLY CONDUCTIVE SHEET MATERIAL

(71) Applicant: CARL FREUDENBERG KG, Weinheim (DE)

(72) Inventors: Gunter Scharfenberger, Frankenthal (DE); Gerhard Schoepping, Weinheim (DE); Birger Lange, Darmstadt (DE); Gerald Jarre, Weinheim (DE); Michael Zaminer, Weinheim (DE); Judith Haller, Bruchsal (DE)

(73) Assignee: Carl Freudenberg KG, Weinheim (DE)

( * ) Notice: Subject to any disclaimer, the term of this patent is extended or adjusted under 35 U.S.C. 154(b) by 581 days.

(21) Appl. No.: 14/415,754

(22) PCT Filed: Jul. 15, 2013

(86) PCT No.: PCT/EP2013/002092
§ 371 (c)(1),
(2) Date: Jan. 20, 2015

(87) PCT Pub. No.: WO2014/012649
PCT Pub. Date: Jan. 23, 2014

(65) Prior Publication Data
US 2015/0200405 A1    Jul. 16, 2015

(30) Foreign Application Priority Data
Jul. 20, 2012   (EP) ..................................... 12005313

(51) Int. Cl.
*H01M 4/80* (2006.01)
*H01M 4/82* (2006.01)
(Continued)

(52) U.S. Cl.
CPC .......... *H01M 8/026* (2013.01); *D04H 1/4242* (2013.01); *D04H 1/46* (2013.01);
(Continued)

(58) Field of Classification Search
CPC ............................... H01M 8/18; H01M 8/188
See application file for complete search history.

(56) References Cited

U.S. PATENT DOCUMENTS 4,786,453 A * 11/1988 Berger .................... B29C 70/14
    264/136
5,648,184 A    7/1997 Inoue et al.
(Continued)

FOREIGN PATENT DOCUMENTS

DE       10050512 A1    5/2002
FR       2592404 A1     7/1987
(Continued)

*Primary Examiner* — Olatunji A Godo
*Assistant Examiner* — Julian Anthony
(74) *Attorney, Agent, or Firm* — Leydig, Voit & Mayer, Ltd.

(57) ABSTRACT

An electrically conductive sheet material having a base body with fibers, at least part of the fibers having carbon fibers, optionally having channels extending through the base body, capable of providing an electrically conductive and flexible sheet material which has a low electrical resistance and which can be produced on a large scale in the most simple, cost-effective and reproducible manner possible.

18 Claims, 5 Drawing Sheets

(51) Int. Cl.
*H01M 6/00* (2006.01)
*H01M 4/36* (2006.01)
*H01M 4/48* (2010.01)
*H01M 6/20* (2006.01)
*H01M 8/026* (2016.01)
*D04H 1/4242* (2012.01)
*D04H 1/492* (2012.01)
*H01B 1/04* (2006.01)
*H01M 8/18* (2006.01)
*H01M 8/0234* (2016.01)
*H01M 8/0245* (2016.01)
*H01M 8/0247* (2016.01)
*D04H 1/46* (2012.01)
*H01B 5/00* (2006.01)
*H01M 8/20* (2006.01)

(52) U.S. Cl.
CPC ............... *D04H 1/492* (2013.01); *H01B 1/04* (2013.01); *H01B 5/00* (2013.01); *H01M 8/0234* (2013.01); *H01M 8/0245* (2013.01); *H01M 8/0247* (2013.01); *H01M 8/188* (2013.01); *H01M 8/20* (2013.01); *Y02E 60/528* (2013.01)

(56) References Cited

U.S. PATENT DOCUMENTS

| | | | |
|---|---|---|---|
| 6,511,768 B1* | 1/2003 | Trapp | D04H 1/46 204/283 |
| 2003/0109189 A1 | 6/2003 | Jorder et al. | |
| 2004/0161658 A1* | 8/2004 | Mizuno | H01M 8/241 429/483 |
| 2011/0281169 A1 | 11/2011 | Zheng et al. | |
| 2014/0065460 A1* | 3/2014 | Evans | H01M 8/20 429/101 |

FOREIGN PATENT DOCUMENTS

| | | |
|---|---|---|
| JP | H 08287923 A | 11/1996 |
| JP | 2001085028 A | 3/2001 |
| JP | 2003308851 A | 10/2003 |
| JP | 2004131855 A | 4/2004 |
| JP | 4632043 B2 | 2/2011 |
| JP | 2012030230 A | 2/2012 |
| WO | WO 0231841 A2 | 4/2002 |
| WO | WO 2013061079 A1 | 5/2013 |
| WO | WO 2013/126083 A1 | 8/2013 |

\* cited by examiner

ELECTRICALLY CONDUCTIVE SHEET MATERIAL

CROSS-REFERENCE TO RELATED APPLICATIONS

This application is a U.S. National Stage application under 35 U.S.C. § 371 of International Application No. PCT/EP2013/002092, filed on Jul. 15, 2013, and claims benefit to European Patent Application No. 12005313.7, filed on Jul. 20, 2012. The International Application was published in German on Jan. 23, 2014, as WO 2014/012649 A1 under PCT Article 21(2).

FIELD

The invention relates to an electrically conductive sheet material and a method of forming the electrically conductive sheet material.

BACKGROUND

Electrically conductive sheet materials, for example electrically conductive textile sheet materials, are of interest for a multiplicity of applications. A key application is the use of electrically conductive sheet materials in an energy storage medium, particularly for storing renewable energies, for example hydrodynamic power, wind energy, solar radiation and geothermal energy, and for storing energies generated from renewable raw materials.

A wide variety of batteries are often used for energy storage. These batteries are employed in the form of primary or secondary cells, or in electroplating, NaCl electrolysis and the electrolytic synthesis of inorganic compounds. Non-rechargeable batteries are known as primary cells. Secondary cells, which were developed to store surplus electrical energy, have moved into the focus of research and political attention in view of the scarcity of fossil raw materials and the use of renewable energies. Nickel-cadmium, lead-acid, lithium-ion and nickel-metal hydride batteries are the best-known secondary cells.

A redox flow cell is a type of rechargeable battery where electrical energy is stored in chemical reactants dissolved in a solvent. In effect, two energy-storing solutions of electrolyte circulate in two separate circuits wherebetween ion exchange takes place in the cell, by means of a membrane. The energy-storing solutions of electrolyte are stored in separate tanks outside the cell, so energy quantity as well as power output can be scaled independently of each other. The tanks are simple to fill manually. Because the solutions of electrolyte are exchanged, they can also be charged and discharged in separate batteries. Cell voltage is typically between 1.0 and 2.2 V. This holds for vanadium redox flow batteries in particular.

A membrane divides the redox flow cell into two half-cells. The membrane is permeable for the counter-ions of the electrolyte solutions and each half-cell is bounded by an electrode where a chemical reaction—reduction or oxidation—takes place.

The membranes used are typically microporous separators, which allow all ions to pass through, or selective anion or cation exchanger membranes. The membrane is designed to prevent the two solutions of electrolyte from mixing.

The electrodes, which are designed to be useful for a high range of electrochemical voltage in aqueous solutions, usually consist of graphite, in general. Graphite felts having a high specific surface area are used as electrode material for a very high specific power output.

JP 4632043 B2 discloses a carbon fiber felt obtained by carbonization of oxidized polyacrylonitrile (PAN-OX) fibers, while a felt is obtainable by needlepunching. Owing to the fiber structure of the felt described in JP 4632043 B2, fiber alignment and conductance alignment have mutually different orientations. As a result, the current has to pass through a multiplicity of fibrous nodes, which greatly increases the electrical resistance of the felt.

JP 2003 308851 A describes an electrode material comprising a nonwoven fabric comprising carbonaceous fibers. It is formed at high temperatures under an inert atmosphere. The felt structure further limits the porosity and thus also the pressure drop. JP 2001 085028 A shows a carbon electrode material for use in a redox flow battery in aqueous systems of electrolyte.

The electrode materials described in JP 2003 308851 A and JP 2001 085028 A do not have directed structures, which makes it difficult for a fluid, in particular an electrolyte solution, to flow therethrough. This leads to increased electrical resistance and a high pressure drop during the flow through the electrode material. The aforementioned electrode materials further have a rough surface which, on contact with a bipolar plate, increases the electrical resistance. A high degree of fiber irregularity on the part of these materials amplifies abrasion to shorten the useful life of these electrode materials.

DE 100 505 12 A1 describes a conductive nonwoven fabric comprising carbon fibers. This nonwoven fabric is from 80 to 500 µm in thickness.

SUMMARY

An aspect of the invention provides an electrically conductive sheet material comprising a main body, the main body comprising: fibers comprising carbon fibers; and channels.

BRIEF DESCRIPTION OF THE DRAWING

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention provides an electrically conductive and flexible sheet material that has a low level of electrical resistance and is obtainable on a large industrial scale in a very simple, very inexpensive and very highly reproducible manner.

The inventors realized that a sheet material with channels in the main body leads to improved flow of a fluid through the sheet material. At the same time, the flow resistance and the pressure drop are low. It was further determined that the sustained use performance of the sheet material under technical conditions is outstanding.

The sheet material in one preferred embodiment has channel diameters in the range from 1 to 500 µm, preferably in the range from 5 to 400 µm, in particular in the range from 10 to 300 µm. Particular preference is given to a sheet material having a channel diameter in the range from 50 to 200 µm. These sizes of channel diameters advantageously ensure that there are enough reactive sites at the surface which, when the sheet material is employed as an electrode material, make an outstanding exchange of electrons possible between the electrolyte solutions and the electrode material. As a result, the electrical conductivity of the sheet material is distinctly enhanced. The channel diameter of the sheet material is determined via scanning electron microscopy. To this end, an electron beam is scanned in a certain pattern over the cross section of a sheet material and the resulting interactions of the electrons with the sample are used to create an image of the sample. The channels obtained on the image are subsequently determined in line with the magnification factor.

Particular preference is given to sheet materials whose main body comprises a first and a second frontal plane, wherein the channels are orthogonal to the frontal planes. A channel arrangement of this type is advantageous because flow through the channels can be particularly uniform and the electrical resistance can be reduced at the same time.

In a further preferred embodiment, the main body of the sheet material comprises a first and a second frontal plane, wherein the channels form an acute angle with the frontal planes. A channel structure of this type is advantageous because the sheet material obtained has a multiplicity of channels. A uniform flow through a sheet material of this type further means that its pressure drop is low.

The sheet material in a further preferred embodiment has a fold-type structure, wherein the fold edges thereof are at least partially interconnected. The stability of the sheet material is distinctly increased by the partial interconnection at the fold edges. Fraying of the fibers in the fiber direction is further prevented, which advantageously extends the useful life of the sheet material.

In a particularly advantageous embodiment, the fold edges are interconnected by knitting, weaving and/or consolidation on one side of the main body at least. The different ways of interconnecting the fold edges can be used to influence the stability of the sheet and thereby achieve versatility in use for the sheet material. A further advantage of the different forms of interconnection is that the stable sheet material is simultaneously still flexible along and across.

Consolidation may be mechanical. Either a needling technique is used for this or interentangling of the fibers by means of jets of water and/or steam.

The sheet material could be a pleated sheet material and folded together into a block. Owing to this structure, the individual fibers of the sheet material have an orientation in the conductance direction, reducing the electrical resistance. The channel structure further leads to a distinct reduction in the flow resistance and the pressure drop.

Depending on the manner of folding, the sheet material could have different thicknesses in the range from 1 to 15 mm. Particular preference is given to thicknesses in the range from 3 to 12, in particular in the range from 5 to 10 mm. This makes possible the use of a custom-tailored stable sheet material for a very wide range of applications. Sheet material thickness was determined according to DIN EN ISO 9073-2.

Practical tests have shown that a particularly high electrical conductivity is attainable at a porosity of 40 to 95%, preferably of 60 to 90%, more preferably of 70 to 80%. Further tests have determined that particularly low flow resistances are achievable at a porosity in the range from 80 to 99%, more preferably in the range from 85 to 97%, especially in the range from 90 to 95%. Porosity is the ratio of the void volume of a substance or composition to its overall volume. Porosity serves as a classifying measure of the voids actually present. The flow resistance in these porosity ranges is advantageously relatively low. A sheet material having a high porosity has the advantage of there being a multiplicity of reactive sites to ensure an outstanding exchange of electrons between the electrolyte solutions and the electrode material.

Porosity was determined as follows from three weighings. To this end, the sheet material was dried at 80° C. in vacuo for 24 hours. The weighing of the dried sheet material was repeated until a constant value was obtained. The samples were then saturated with distilled water in vacuo and filled in a desiccator with water until the sheet material is completely covered therewith. Following a quiescent period of 72 hours, the dipped weighings were carried out. To this end, the wet samples are introduced with a sample holder into a container filled with distilled water and the weight of the wet sample is determined from the displaced water. In addition, the weight of the wet sample was determined. The porosity n was then determined using the following formula:

$$n = \frac{G_{wet\ weighing} - G_{dry\ weighing}}{G_{wet\ weighing} - G_{dipped\ weighing}}.$$

In a further embodiment, the sheet material may comprise fibrous layers of differing porosity. This progressive construction promotes electrolyte transport.

Particular preference is given to a sheet material having an electrical conductivity of 10 to 300 S/cm², preferably of 50 to 250 S/cm², more preferably of 100 to 200 S/cm² perpendicularly to the end planes, which are orthogonal to the frontal planes. Owing to these electrical conductivity values, the sheet material is very useful in energy storage units.

Electrical conductivity cannot be measured directly, but is usually determined via transportation measurements from current, descending voltage and sample geometry similarly to specific resistance. Electrical conductivity is reciprocal resistance. To determine the electrical conductivity of the sheet material, a sample was secured under pre-tension by means of two clamps and silverized in two places. The clamps are secured at these places and the resistance is determined using a resistance measuring appliance. The distance between the two clamps was about 100 mm. The resistance determined can subsequently be arithmetically converted into the conductivity.

In an alternative embodiment of the invention, the sheet material may have an electrical conductivity in the range from 5 to 300 S/cm², preferably in the range from 10 to 150 S/cm², especially in the range from 15 to 50 S/cm², as measured at a density of 350 kg/m³ at a temperature in the range from 20 to 22° C. and at a pressure of 1013 mbar by the following procedure:

The density is determined from the basis weight and the thickness of the sample taken, the thickness being determined according to the applied pressure.

The electrical conductivity is determined galvanostatically. For this purpose, the electric resistance is determined using a 2 point resistance measurement.

An annular sample having an inner diameter of 45 mm and an outer diameter of 56 mm is taken. This corresponds to a sample area of 8.73 cm$^2$. The sample taken is then placed in the center of a lower ring electrode. An upper electrode is then placed on top of the lower electrode, so the sample taken is situated between the two electrodes. A current of 1 A is applied. It flows first through the lower electrode and then through the upper electrode. The voltage drop between the two electrodes is measured thereafter using a potentiometer. The electrical resistance R is subsequently calculated according to the following formula:

$$R = \frac{U}{I}.$$

The calculated volume resistance relates to the area of the sample body. The electrical conductivity is obtained by forming the reciprocal of the electrical resistance.

The electrically conductive sheet material could utilize polyester and/or polypropylene fibers, polyacrylonitrile fibers (PAN), cellulose fibers, pitch fibers, lignin fibers and/or phenolic resin fibers as starting material for the carbonized fibers.

The fluid used could be any of a very wide variety of electrolyte solutions. The electrolyte solution typically contains a soluble salt and solvent. The composition of the electrolyte solutions and/or their concentration is the chief determinant of the energy density together with the cell voltage. For example, acidic aqueous solutions of iron chloride and chromium chloride in hydrochloric acid, iron chloride and titanium chloride in hydrochloric acid or methanesulfonic acid are used in a redox flow cell. Further conceivable redox pairs are cerium, zinc or bromine. It is preferable to use aqueous acidic solutions of sulfuric acid and vanadium.

The sheet materials could have basis weights of 100 to 1000 g/m$^2$. Preference is given to using sheet materials having a basis weight of 300 to 800 g/m$^2$, while basis weights of 400 to 700 g/m$^2$ are particularly preferable. It is very particularly preferable for the basis weight to be in the range from 200 to 500 g/m$^2$, especially in the range from 250 to 400 g/m$^2$. A sheet material having such basis weights possesses excellent stability and high strength. The basis weight was determined to DIN EN 12127.

In one preferred embodiment, the sheet material is obtained via a fold-forming method. A Kunit, OptiKnit®, MaliKnit or MultiKnit® loop-forming method could be used for fold forming. In the Kunit loop-forming method, a fibrous web comprising a longitudinally oriented ply of fiber is converted by the application of knitting needles into a one-sidedly stitch-bonded nonwoven fabric. A MultiKnit® loop-forming method produces sheet materials having an ensemble structure wherein the fibrous web comprises a longitudinally oriented ply of fiber and is both-sidedly stitch-bonded. In the MaliKnit loop-forming method, a fibrous web comprising a transversely oriented ply of fiber is converted by the application of knitting needles into a one-sidedly stitch-bonded nonwoven fabric. A sheet material produced by an OptiKnit® loop-forming method consists of one fibrous web comprising a longitudinally oriented ply of fiber and of one fibrous web comprising a transversely oriented ply of fiber, these two webs being both-sidedly stitch-bonded. The sheet material could further be formed by pleating. First, the desired shape and size is obtained by cutting a fibrous web and subsequently ironed. Pleating, i.e., folding, is the next step. This can be done using a pleating machine or manually. The folds are fixed by thermal treatment and then machine sewn together. These specific production processes can be used to realize the different channel structures in the main body of the sheet material. The fold-forming method may further be used to form a voluminous and soft sheet material. The sheet materials are further notable for good mechanical properties and excellent abrasion resistance.

There are some applications for the sheet material where it is advantageous to enhance the surface energy of the sheet material by corona and/or plasma treatment. This corona or plasma treatment is preferably carried out such that the surface acquires an ISO 9000 surface energy of more than 38 dyn, preferably 38 to 72 dyn, in particular 40 to 60 dyn. It is advantageous here that the surface may be given a hydrophilic or hydrophobic finish without admixture of chemicals.

The sheet material may further be subjected to a chemical finishing operation, for example a hydrophilization.

In one preferred embodiment, the arrangement comprises a sheet material and an electrical source, wherein there is a conductance direction between a first half-cell and a second half-cell and the fibers are aligned along it. An arrangement of this type advantageously has a low level of electrical resistance.

The present invention also comprehends a method of forming an electrically conductive sheet material, comprising the steps of:
 a) providing at least one fibrous web,
 b) preconsolidating the fibrous web,
 c) creating a fold-type structure and interconnecting fold edges (6) to produce the sheet material, and
 d) carbonizing and/or graphitizing the sheet material.

The method of the present invention has the advantage that apart from a sheet-forming process no further operations are needed to integrate an electrically conductive material nor any additional stabilizing measures to enhance the strength of the sheet material. The method may further be used to form a voluminous sheet material.

The fibrous web is obtainable using the technologies known per se. The lightly prebonded fibrous web having moderate strengths may utilize inexpensive fiber raw materials.

The fibrous web may be preconsolidated mechanically by interentangling the fibers. Either a needling technique is used for this or interentangling with jets of water and/or steam. Needle punching gives a softer sheet material having a lower basis weight.

It is particularly preferable for the fibrous web to be preconsolidated using a low pressure hydroentangling process. The hydroentangling consolidation may take place at temperatures in the range from 10 to 40° C. Preconsolidation may also be effected using high pressure water jets at pressures in the range from 100 to 300 bar.

Fold edges may be interconnected by knitting, weaving and/or consolidation on one side at least. It is also conceivable to effect consolidation with high energy water jets at pressures in the range from 100 to 300 bar. In this process, the fibers become entangled and interbonded.

To densify the sheet material, it could be densified to about 50 to 90% of its initial thickness by means of a calendar.

Carbonizing and/or graphitizing could take place under a protective gas atmosphere at a temperature in the range from 800 to 2500° C.

The invention comprehends a further method of forming an electrically conductive sheet material, comprising the steps of:
a) providing at least two fibrous webs such that the fiber orientations of the fibrous webs have different preferential directions,
b) superposing the fibrous webs to create an ensemble,
c) preconsolidating the fibrous web,
d) creating a fold-type structure and interconnecting fold edges to produce the sheet material, and
e) carbonizing and/or graphitizing the sheet material.

It is advantageous here that a sheet material having enhanced ultimate tensile strength in the transverse direction is obtainable by using two or more fibrous webs having different fiber alignments. The method of the present invention can further be used to form a thin but nonetheless very stable and strong sheet material in a simple and inexpensive manner.

Laydown of the fibrous webs may take a very wide variety of forms. Possibilities are random technology or combinations of longitudinal and/or transverse laying when specific properties are to be enabled for the sheet material and/or when the fiber structure is to have a multi-ply construction.

In a further embodiment, the sheet material is finished by functionalization, coating and/or impregnation. Finished in the context of this invention is to be understood as meaning being subjected to a brief or permanent, thermal, chemical and/or physical alteration of the sheet material to endow the latter with certain performance characteristics, for example good wettability, enhanced electrical conductivity and enhanced porosity.

The functionalization of the surface of the sheet material may be effected thermally, chemically and/or physically. It serves to modify the chemical surface structure of the sheet material, in particular to generate carboxylic acid, carbonyl and aldehyde groups on the surface of the sheet material. In a chemical functionalization, the surface of the sheet material is modified with an acid, corona treatment and/or plasma treatment. This enhances the wettability, electrical conductivity, porosity and also hydrophilicity of the sheet material.

Impregnation serves to enhance the wettability, electrical conductivity and porosity of the sheet material. The impregnating is accomplished by single-step or multi-step pad-mangling wherein an exactly defined amount of active ingredient is uniformly applied to each $m^2$ of textile material. In pad-mangling, a liquor is forced by roll pressure into a fabric. The term liquor here always denotes the entirety of all its component, i.e., the solvent (usually water) as well as all dissolved, emulsified or dispersed constituents present therein, such as dyes, particles, pigments, chemicals and auxiliaries. Penetration of impregnants in the form of solutions or emulsions of the active ingredients concerned could be facilitated by addition of wetting agents to reduce the surface tension.

Particles could be provided to the surface of the sheet material by coating. The particles used could be conductive carbonaceous materials, for example graphite or conductivity grade carbon black. The particles are preferably applied to the sheet material in the form of a paste. It is particularly preferable to apply an aqueous phase to the surface of the sheet material. Application could be for example by spraying, blade coating, pad-mangling or kiss coating.

Any smooth-surfaced printing roll or a printing roll having etched, machined or bordered recesses on the surface is used in kiss coating. The paste transfers from the printing roll onto the sheet material to be coated. The recesses may have any desired size or shape and may form a continuous or discontinuous distribution on the surface of the printing roll. Coating may further be used to enhance the surface of the sheet material and also the mechanical stability distinctly. The wetting behavior may further be enhanced via the addition of particles.

The finishing or treating of the sheet materials serves firstly to protect the surface or fiber, to improve and/or modify the properties thereof or to achieve novel sets of properties. It is advantageous here that the surface of the sheet material can be finished in a simple and inexpensive manner. This makes versatile employment of the sheet material possible.

The starting material used for the sheet material could further be a mixture of the aforementioned carbonized fibers and polyvinyl alcohol (PVA) fibers. Generating the electrically conductive sheet material is effected by the method of the present invention. The channel diameter could further additionally be modified in a further step. To this end, the polyvinyl alcohol (PVA) fibers are dissolved out of the sheet material before the sheet material is carbonized and/or graphitized. The polyvinyl alcohol (PVA) fibers are dissolved out by addition of water. The sheet material is subsequently dried with or without a tenter. The sheet material obtained in this case is carbonized and/or graphitized in the next step. It is advantageous here that the channel diameter can be increased in a simple manner by modifying the sheet material. The sheet material is further notable for outstanding porosity.

Fibers could further be dissolved out thermally during the carbonization and/or graphitization. What is advantageous in this case is that the porosity of the sheet material can be increased by removing the fibers. Thermal removal may comprise the step of burning or to be more precise the step of burning out.

The electrically conductive sheet material could be used in an energy storage unit. It is advantageous in this case that the efficiencies and life expectancy of the sheet material are high. The sheet material is further notable for excellent resistance under corrosive conditions.

The electrically conductive sheet material could finally be used as a redox flow electrode. These are widely used in stationary applications because of their power outputs from one kilowatt to several megawatts. They can be used as grid stabilizers, as storage buffers for renewable energies, in particular as stores for uninterrupted power supply, and as a decentralized energy supply unit. The sheet material is further very useful as a redox flow electrode on account of its high efficiency. Using the sheet material in a redox flow electrode further has the advantage that the electrode material remains unchanged.

In a further embodiment, the redox flow electrode may be constructed from two or more layers of the sheet material to increase the electrode area.

For example, the sheet material may be used in a vanadium redox flow cell as a backup source for cellphone base stations or buffer battery for wind power systems. These systems, being capable of a power output of six megawatts for ten hours, can supply sufficient power.

Further conceivable applications for the sheet material are its use in lithium-metal-polymer batteries, lithium-ion batteries and double layer capacitors.

It is also conceivable to use the sheet material as a gas diffusion layer because of its electrical conductivity and its channel-type structure.

Figure 1:
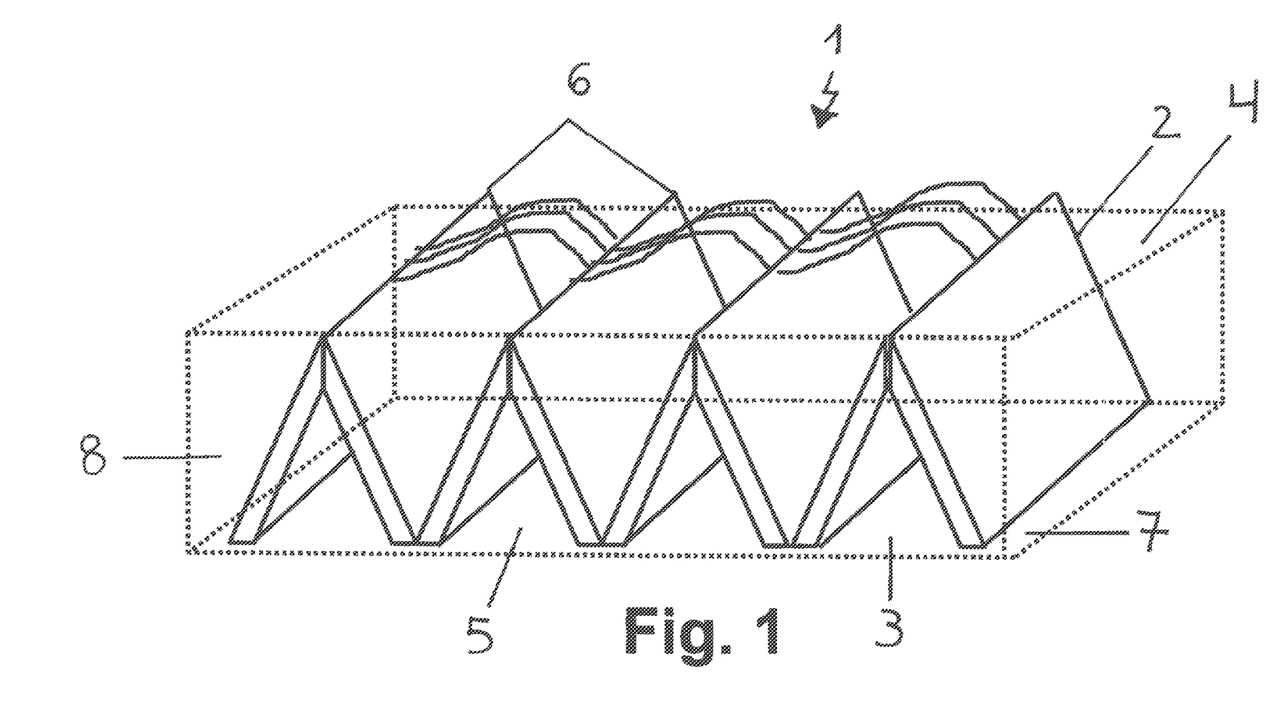
FIG. 1 a sheet material having channels in the main body.

FIG. 1 shows an electrically conductive sheet material 1 comprising a main body 2 comprising fibers, wherein the fibers comprise carbon fibers in part at least. The main body 2 comprises channels 3.

The fibers are all carbonized fibers.

The channels 3 are triangular in cross section.

The sheet material 1 exhibits a channel diameter in the range from 1 to 500 μm. In this sheet material 1, the channels 3 have a diameter of 250 μm.

The main body 2 further comprises a first frontal plane 4 and a second frontal plane 5, wherein the channels 3 form an acute angle with the frontal planes 4, 5. The angle is less than 10° in this particular case.

The sheet material 1 further comprises a fold-type structure, wherein the fold edges 6 thereof are at least partially interconnected. The fold edges 6 are connected on one side only.

The interconnecting of the fold edges 6 is effected by knitting, weaving, and/or consolidation on one side of the main body 2 at least. The fold edges 6 are interconnected by needle consolidation on the side of frontal plane 4.

The sheet material 1 exhibits a thickness of 1 to 15 mm. The sheet material 1 depicted in FIG. 1 has a thickness of 5 mm.

The porosity is 40 to 95%. The sheet material 1 in FIG. 1 exhibits specifically a porosity of 80%.

The electrical conductivity perpendicularly to end planes 7, 8, which are orthogonal to the frontal planes 4, 5, is in the range from 10 to 300 S/cm$^2$.

The sheet material 1 has basis weights in the range from 100 to 1000 g/m$^2$. The basis weight of sheet material 1 in FIG. 1 is 500 g/m$^2$.

The sheet material 1 has further been obtained via a fold-forming method, in this specific case by a Kunit loop-forming method.

The method of forming the electrically conductive sheet material 1 comprises the steps of:
a) providing at least one fibrous web,
b) preconsolidating the fibrous web,
c) creating a fold-type structure and interconnecting fold edges 6 to produce the sheet material 1, and
d) carbonizing and/or graphitizing the sheet material 1.

The fibrous web is preconsolidated using a low pressure hydroentangling process. The hydroentangling process takes place at temperatures in the range from 10 to 40° C.

The carbonization and/or graphitization is effected under a protective gas atmosphere at 800 to 2500° C.

Figure 1A:
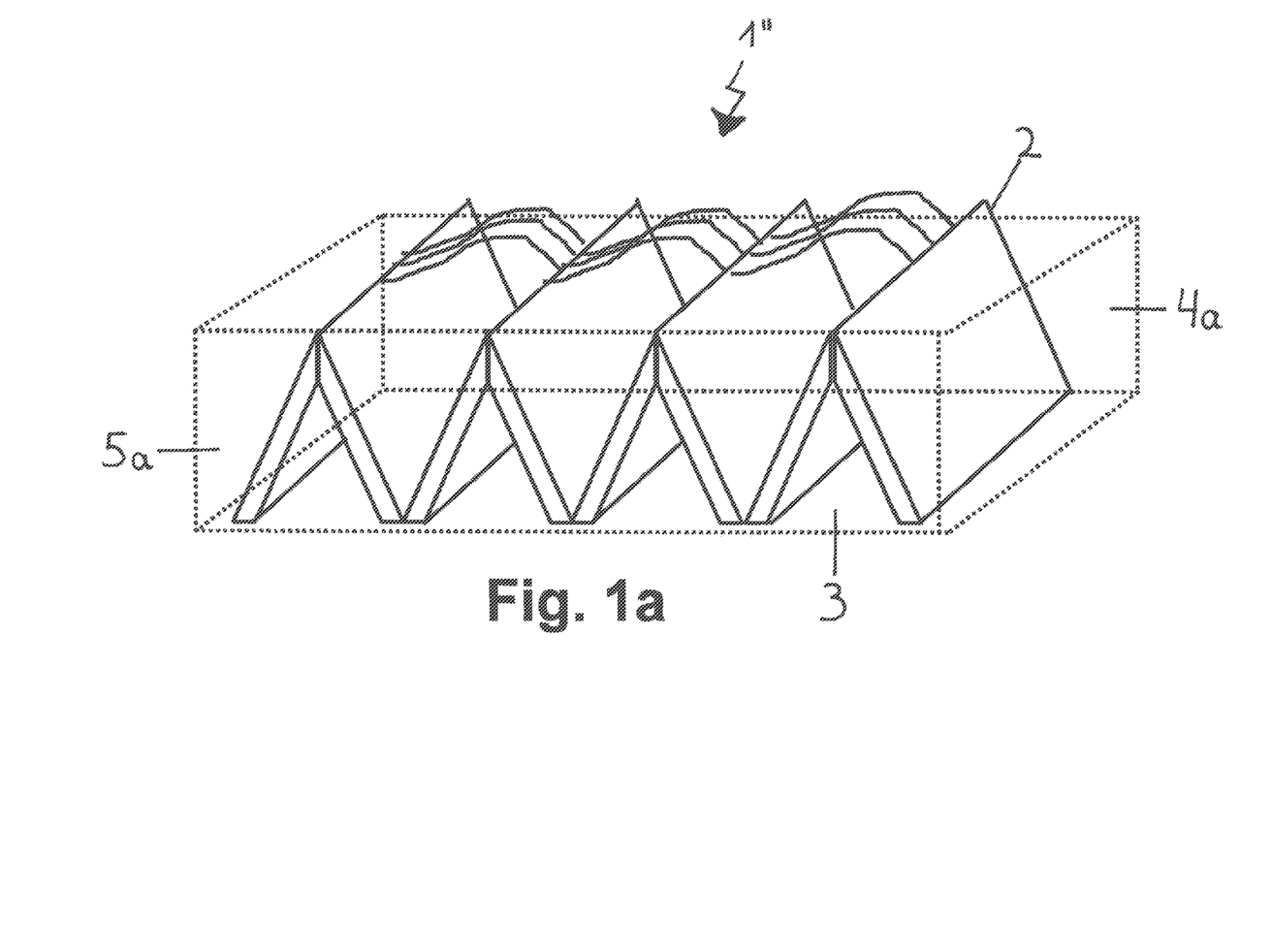
FIG. 1a a further sheet material having channels in the main body.

FIG. 1a shows an electrically conductive sheet material 1" comprising a main body 2 comprising fibers, wherein the fibers comprise carbon fibers in part at least. The main body 2 comprises channels 3.

The main body 2 comprises a first frontal plane 4a and a second frontal plane 5a, wherein the channels 3 are orthogonal to the frontal planes 4a, 5a.

Figure 2:
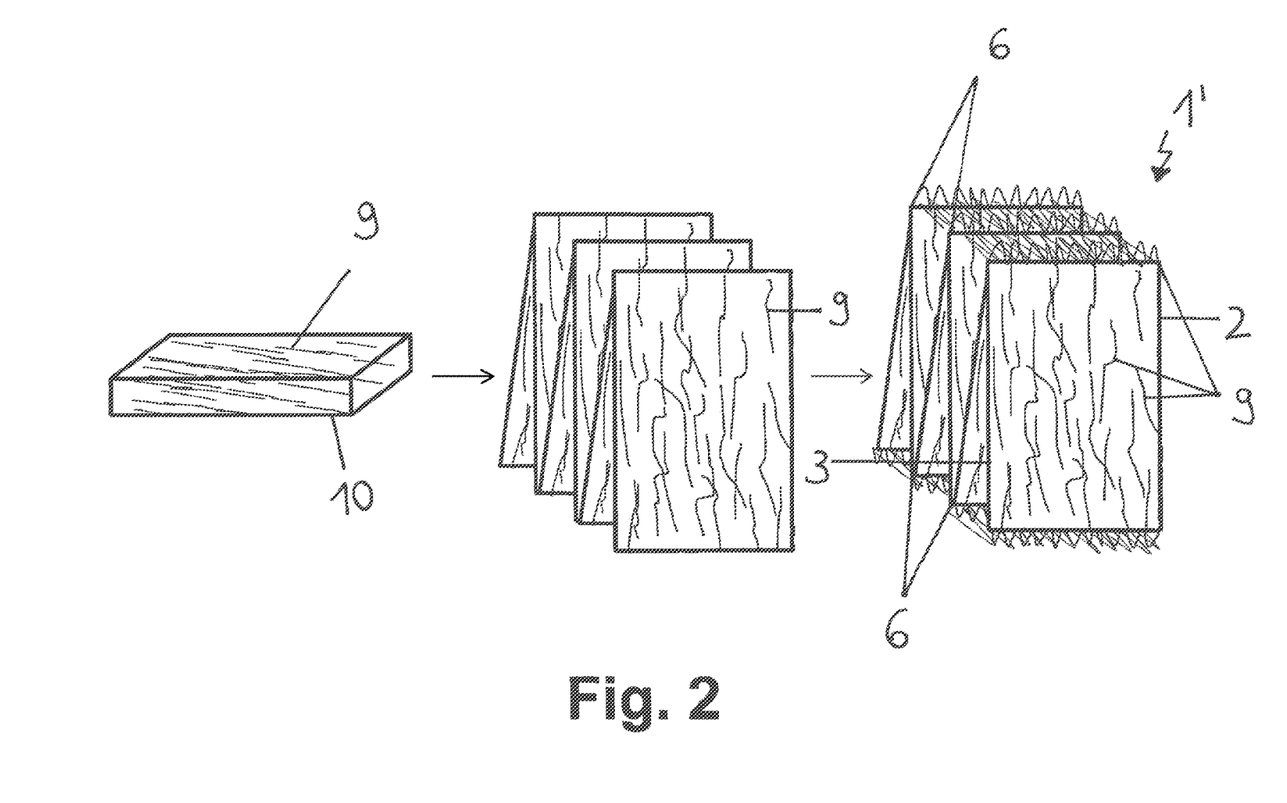
FIG. 2 a sheet material having channels in the main body and also figuratively depicted individual steps of a process for forming the sheet material.

FIG. 2 in the central and right-hand view shows an electrically conductive sheet material 1' comprising a main body 2 comprising fibers 9, wherein the fibers 9 comprise carbon fibers in part at least. The main body 2 comprises channels 3.

The fibers 9 are all carbonized fibers.

The channels 3 are triangular in cross section.

The sheet material 1' exhibits a channel diameter of 50 μm.

The main body 2 further comprises a first frontal plane 4 and a second frontal plane 5, wherein the channels 3 form an acute angle with the frontal planes 4, 5. The angle is less than 10° in this particular case.

The sheet material 1' further exhibits a fold-type structure, wherein its fold edges 6 are interconnected on both sides by looping and entangling the fibers 9 of the fibrous web 10. The looping and entangling is effected parallel to the frontal planes 4, 5.

The interconnecting of the fold edges 6 on both sides of the main body 2 is effected by knitting, weaving, and/or consolidation. The fold edges 6 are interconnected by needle consolidation on both sides of frontal planes 4, 5.

The sheet material 1' exhibits a thickness of 10 mm and a porosity of 60%, and also an electrical conductivity of 200 S/cm$^2$ perpendicularly to end planes 7, 8, which are orthogonal to the frontal planes 4, 5.

The basis weight of sheet material 1' is 800 g/m$^2$.

The sheet material 1' has further been obtained via a fold-forming method, in this specific case by an OptiKnit® loop-forming method.

The method of forming the electrically conductive sheet material 1' as per FIG. 2 comprises the steps of:
a) providing at least one fibrous web 10,
b) preconsolidating the fibrous web 10,
c) creating a fold-type structure and interconnecting fold edges 6 to produce the sheet material 1', and
d) carbonizing and/or graphitizing the sheet material 1'.

The fibrous web 10 is preconsolidated using a low pressure hydroentangling process. The hydroentangling process takes place at temperatures in the range from 10 to 40° C. The fibers 9 of fibrous web 10 are perpendicular to the frontal planes 4, 5.

The carbonization and/or graphitization is carried out under a protective gas atmosphere at 800 to 2500° C.

Figure 3:
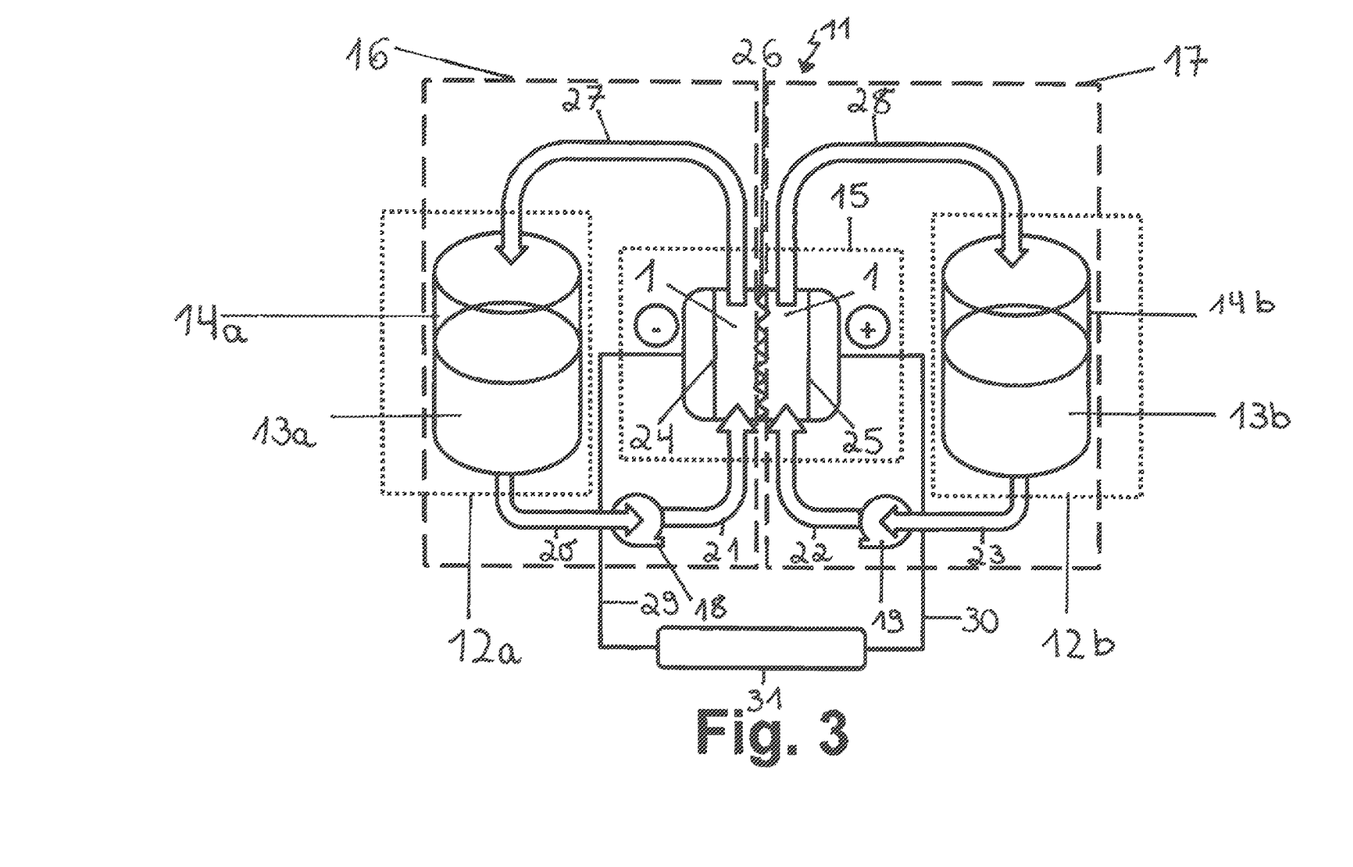
FIG. 3 a schematic depiction of a redox flow cell.

FIG. 3 shows the use of sheet material 1 in a redox flow cell 11. The redox flow cell 11 consists of outer regions 12a, b, where the electrolyte solutions 13a, b are stored in tanks/containers 14a, b, and an electrolytic cell 15.

The electrolyte solutions 13a, b are stored in separate containers 14a, b outside the electrolytic cell 15, while the two energy-storing electrolyte solutions 13a, b are circulated in two separate electrolyte circuits 16, 17. The containers 14a, b are filled with electrolyte solution 13a, b manually or mechanically.

The particular reactive electrolyte solutions 13a, b are conveyed by pumps 18, 19 through lines 20, 21, 22, 23 to electrolytic cell 15 in order to make possible a transformation of electrochemical energy, viz., a charging/discharging.

The electrolytic cell 15 comprises the two half-cells 24 and 25. A membrane 26 is arranged between the positive half-cell 25 and the negative half-cell 24 to prevent the two electrolyte solutions 13a, b from mixing and to ensure charge equalization. During the storage process, the reduction takes place in the positive half-cell 25 and the oxidation takes place in the negative half-cell 24. During the storage process, electrons flow from the positive half-cell 25 to the negative half-cell 24, while the electrons flow in the opposite direction during discharging. The positive half-cell 25 and the negative half-cell 24 each comprise a sheet material 1. The charged electrolyte solutions 13a, b are conveyed from the positive half-cell 25 and the negative half-cell 24 through the lines 27, 28 into the two containers 14a, b.

An electrolyte solution 13a, b consists generally of a salt dissolved in solvent. In this case, a vanadium/vanadium electrolyte solution 13a, b is used. During the charging process, the divanadyl cation ($VO_2^+$) is formed by reduction of the vanadyl cation ($VO^{2+}$). In the oxidation, the vanadyl cation is converted into vanadium pentoxide ($V_2O_5$).

The membrane 26 is either microporous and all ions can pass through the membrane 26, or it is a selective anion or cation exchanger membrane. The membrane 26 prevents the two electrolyte solutions 13a, b from mixing.

The positive half-cell 25 and the negative half-cell 24 are connected via electric lines 29, 30 to the electric source/sink 31.

Figure 4:
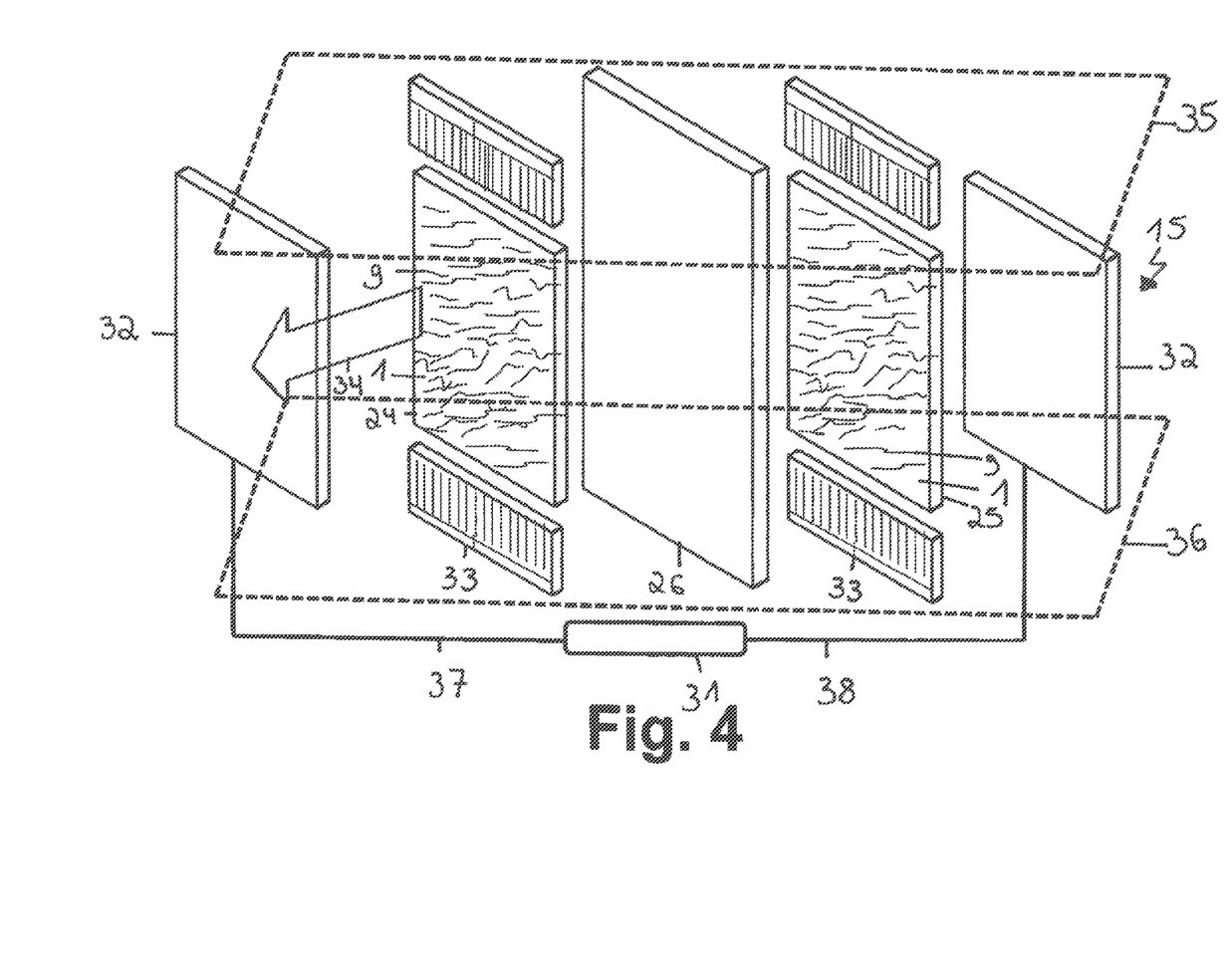
FIG. 4 a schematic arrangement of an electrolytic cell.

FIG. 4 shows a schematic arrangement of an electrolytic cell 15 comprising a sheet material 1 and an electrical source 31, wherein there is a conductance direction between a first half-cell 24 and second half-cell 25 and the fibers 9 are aligned along it.

In this particular case, the fibers 9 are parallel to the base planes 35, 36, while the half cells 24, 25 are aligned orthogonal to the base planes 35, 36. This cell 15 comprises two bipolar plates 32. These establish the electric contact via the electric lines 37, 38 with the electric source/sink 31 as per FIG. 3 in the electric circuit.

A positive half-cell 25 and a negative half-cell 24, each comprising a sheet material 1, are arranged between the bipolar plates 32. The electrolyte solutions 13a, b flow through the two half-cells 24, 25.

Application of an electric field 33 to the two half-cells 24, 25 causes the electron flow 34 to take place. The direction of the electric field determines the direction of the electron flow 34.

The half cells 24, 25 are separated from each other by a membrane 26 or a separator. An ion exchange cell is used as membrane 26 and ensures charge equalization.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An electrically conductive sheet material comprising a main body, the main body comprising:
   fibers comprising carbon fibers; and
   channels,
   the sheet material having a fold-type structure,
   wherein fold edges of the fold-type structure are at least partially interconnected, and
   wherein, on at least one side of the main body, the fold edges are mechanically interconnected to one another by a material of the sheet material by knitting, weaving, or a combination thereof.

2. The sheet material of claim 1, wherein the channels have a channel diameter in a range of from 1 to 500 μm.

3. The sheet material of claim 1, wherein the main body further comprises:
   a first frontal plane; and
   a second frontal plane,
   wherein the channels are orthogonal to the frontal planes.

4. The sheet material of claim 1, wherein the main body further comprises:
   a first frontal plane; and
   a second frontal plane,
   wherein the channels form an acute angle with the frontal planes.

5. The sheet material of claim 1, wherein the sheet material is pleated and is folded into a block.

6. The sheet material of claim 1, having a thickness in a range of from 1 to 15 mm.

7. The sheet material of claim 1, having a porosity in a range of from 40 to 95%.

8. The sheet material of claim 1, having an electrical conductivity in a range of from 10 to 300 $S/cm^2$ perpendicularly to end planes of the sheet material, the end plates being orthogonal to frontal planes of the sheet material.

9. The sheet material of claim 1, having a basis weight in a range of from 100 to 1000 $g/m^2$.

10. The sheet material of claim 1, produced by a process comprising fold-forming.

11. The sheet material of claim 1, wherein the fold edges are interconnected on each side of the main body.

12. The sheet material of claim 1, wherein the fold edges are interconnected by knitting.

13. The sheet material of claim 1, wherein the fold edges are interconnected by weaving.

14. The sheet material of claim 1, wherein the channels have a channel diameter in a range of from 5 to 400 μm.

15. An arrangement, comprising:
   the sheet material of claim 1; and
   an electrical source;
   a first half-cell; and
   a second half-cell,
   wherein there is a conductance direction between the first half-cell and the second half-cell, and
   wherein the fibers are aligned along the conductance direction.

16. A method of forming the sheet material of claim 1, the method comprising:
   (a) preconsolidating at least one fibrous web, to obtain a preconsolidated web
   (b) creating a fold-type structure and interconnecting fold edges with the preconsolidated web, to produce the sheet material; and
   (c) carbonizing, graphitizing, or carbonizing and graphitizing the sheet material.

17. The method of claim 16, further comprising:
   finishing the sheet material finished by functionalization, coating, impregnation, or a combination thereof.

18. A method of forming the sheet material of claim 1, the method comprising:

(a) superposing at least two fibrous webs, fiber orientations of the at least two fibrous webs having different preferential directions, to create an ensemble;
(b) preconsolidating the at least two fibrous webs of the ensemble, to obtain a preconsolidated arrangement;
(c) creating a fold-type structure and interconnecting fold edges of the preconsolidated arrangement, to produce the sheet material; and
(d) carbonizing, graphitizing, or carbonizing and graphitizing the sheet material.

* * * * *